United States Patent [19]
Cola

[11] Patent Number: 5,975,819
[45] Date of Patent: Nov. 2, 1999

[54] GATE ATTACHMENT

[76] Inventor: Rose Ann Cola, 63 Girard Ave., Erial, N.J. 08081

[21] Appl. No.: 09/031,508

[22] Filed: Feb. 26, 1998

[51] Int. Cl.[6] ...................................................... B60P 7/14
[52] U.S. Cl. .......................... 410/129; 410/121; 410/142; 410/141; 410/143
[58] Field of Search .............................. 410/89, 121, 129, 410/142, 141, 143, 144; 296/37.6, 43; 224/42.33, 403, 526, 925; 220/532, 534, 544; 105/390

[56] References Cited

U.S. PATENT DOCUMENTS

| | | | |
|---|---|---|---|
| 3,677,562 | 7/1972 | Bronstein | 410/97 |
| 3,762,097 | 10/1973 | Gallo | 410/151 X |
| 3,764,177 | 10/1973 | Woodward | 296/43 |
| 4,961,677 | 10/1990 | Downard | 410/129 |
| 5,147,103 | 9/1992 | Ducote | 296/37.6 |
| 5,253,913 | 10/1993 | Metivier | 296/37.6 |
| 5,443,586 | 8/1995 | Cargill | 410/143 |
| 5,560,666 | 10/1996 | Vieira et al. | 296/43 X |
| 5,800,145 | 9/1998 | Kelce | 410/142 |

FOREIGN PATENT DOCUMENTS

| | | | |
|---|---|---|---|
| 667558 | 7/1963 | Canada | 224/42.33 |

*Primary Examiner*—Stephen T. Gordon

[57] ABSTRACT

A new gate attachment for mounting to the side walls of a load bed of a vehicle. The inventive device includes an elongate upper cross bar and an elongate lower cross bar spaced apart from the upper cross bar. A plurality of spaced apart elongate ribs are extended between the upper and lower cross bars. A pair of insertion arms are extended from the upper cross bar. Each of the insertion arms has a lower terminal end which are adapted for insertion into a post hole of side wall of load bed of a vehicle.

12 Claims, 2 Drawing Sheets

GATE ATTACHMENT

BACKGROUND OF THE INVENTION

1. Field of the Invention

The present invention relates to accessories for mounting to the load bed of a vehicle and more particularly pertains to a new gate attachment for mounting to the side walls of a load bed of a vehicle.

2. Description of the Prior Art

The use of accessories for mounting to the load bed of a vehicle is known in the prior art. More specifically, accessories for mounting to the load bed of a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art accessories for mounting to the load bed of a vehicle include U.S. Pat. Nos. 5,265,993; 5,259,712; 5,044,682; 4,917,429; 3,330,584; and 2,166,918.

While these devices fulfill their respective, particular objectives and requirements, the aforementioned patents do not disclose a new gate attachment. The inventive device includes an elongate upper cross bar and an elongate lower cross bar spaced apart from the upper cross bar. A plurality of spaced apart elongate ribs are extended between the upper and lower cross bars. A pair of insertion arms are extended from the upper cross bar. Each of the insertion arms has a lower terminal end which are adapted for insertion into a post hole of side wall of load bed of a vehicle.

In these respects, the gate attachment according to the present invention substantially departs from the conventional concepts and designs of the prior art, and in so doing provides an apparatus primarily developed for the purpose of mounting to the side walls of a load bed of a vehicle.

SUMMARY OF THE INVENTION

In view of the foregoing disadvantages inherent in the known types of accessories for mounting to the load bed of a vehicle now present in the prior art, the present invention provides a new gate attachment construction wherein the same can be utilized for mounting to the side walls of a load bed of a vehicle.

The general purpose of the present invention, which will be described subsequently in greater detail, is to provide a new gate attachment apparatus and method which has many of the advantages of the accessories for mounting to the load bed of a vehicle mentioned heretofore and many novel features that result in a new gate attachment which is not anticipated, rendered obvious, suggested, or even implied by any of the prior art accessories for mounting to the load bed of a vehicle, either alone or in any combination thereof.

To attain this, the present invention generally comprises an elongate upper cross bar and an elongate lower cross bar spaced apart from the upper cross bar. A plurality of spaced apart elongate ribs are extended between the upper and lower cross bars. A pair of insertion arms are extended from the upper cross bar. Each of the insertion arms has a lower terminal end which are adapted for insertion into a post hole of side wall of load bed of a vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new gate attachment apparatus and method which has many of the advantages of the accessories for mounting to the load bed of a vehicle mentioned heretofore and many novel features that result in a new gate attachment which is not anticipated, rendered obvious, suggested, or even implied by any of the prior art accessories for mounting to the load bed of a vehicle, either alone or in any combination thereof.

It is another object of the present invention to provide a new gate attachment which may be easily and efficiently manufactured and marketed.

It is a further object of the present invention to provide a new gate attachment which is of a durable and reliable construction.

An even further object of the present invention is to provide a new gate attachment which is susceptible of a low cost of manufacture with regard to both materials and labor, and which accordingly is then susceptible of low prices of sale to the consuming public, thereby making such gate attachment economically available to the buying public.

Still yet another object of the present invention is to provide a new gate attachment which provides in the apparatuses and methods of the prior art some of the advantages thereof, while simultaneously overcoming some of the disadvantages normally associated therewith.

Still another object of the present invention is to provide a new gate attachment for mounting to the side walls of a load bed of a vehicle.

Yet another object of the present invention is to provide a new gate attachment which includes an elongate upper cross bar and an elongate lower cross bar spaced apart from the upper cross bar. A plurality of spaced apart elongate ribs are extended between the upper and lower cross bars. A pair of insertion arms are extended from the upper cross bar. Each of the insertion arms has a lower terminal end which are adapted for insertion into a post hole of side wall of load bed of a vehicle.

Still yet another object of the present invention is to provide a new gate attachment that helps hold items on the load bed of a vehicle in place, especially when the vehicle is moving.

Even still another object of the present invention is to provide a new gate attachment that helps reduce the need for tie-downs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
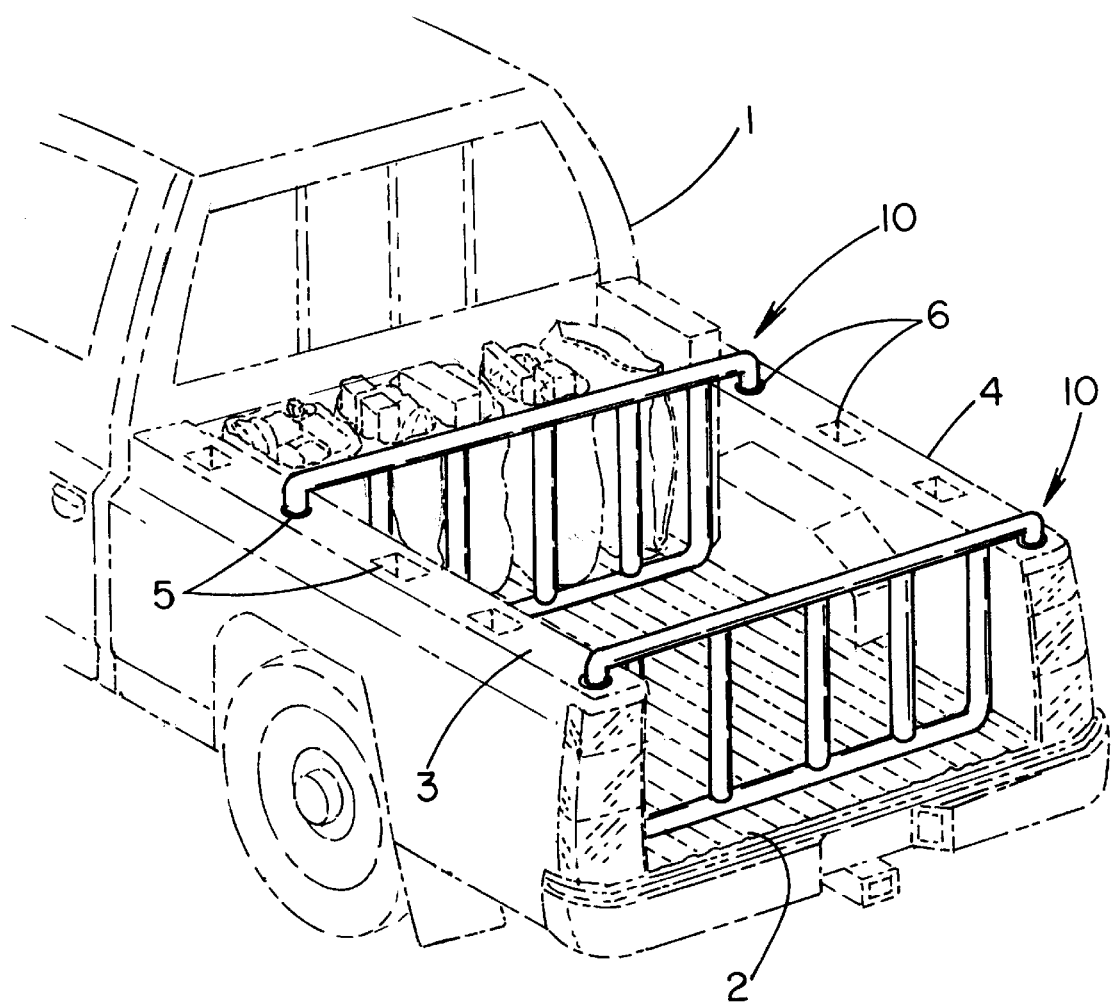
FIG. 1 is a schematic perspective view of a pair of new gate attachments in use according to the present invention.

With reference now to the drawings, and in particular to FIGS. 1 through 5 thereof, a new gate attachment embodying the principles and concepts of the present invention and generally designated by the reference numeral 10 will be described.

As best illustrated in FIGS. 1 through 5, the gate attachment 10 generally comprises an elongate upper cross bar 12 and an elongate lower cross bar 14 spaced apart from the upper cross bar 12. A plurality of spaced apart elongate ribs 16,17,18 are extended between the upper and lower cross bars 12,14. A pair of insertion arms 20,21 are extended from the upper cross bar 12. Each of the insertion arms 20,21 has a lower terminal end 22,23 which are adapted for insertion into a post hole 5,6 of side wall 3,4 of load bed 2 of a vehicle 1.

In use as illustrated in FIG. 1, the gate is designed for mounting to the load bed 2 of a vehicle 1 having side walls 3,4 each with a plurality of post holes 5,6 therein so that items, such as grocery bags and other cargo, may be held in place on the load bed 2, especially when the vehicle 1 is moving. The gate attachment is also designed to be inserted into any of the post holes 5,6 so that the area blocked off by the gate 10 may be enlarged or decreased by a user.

Figure 2:
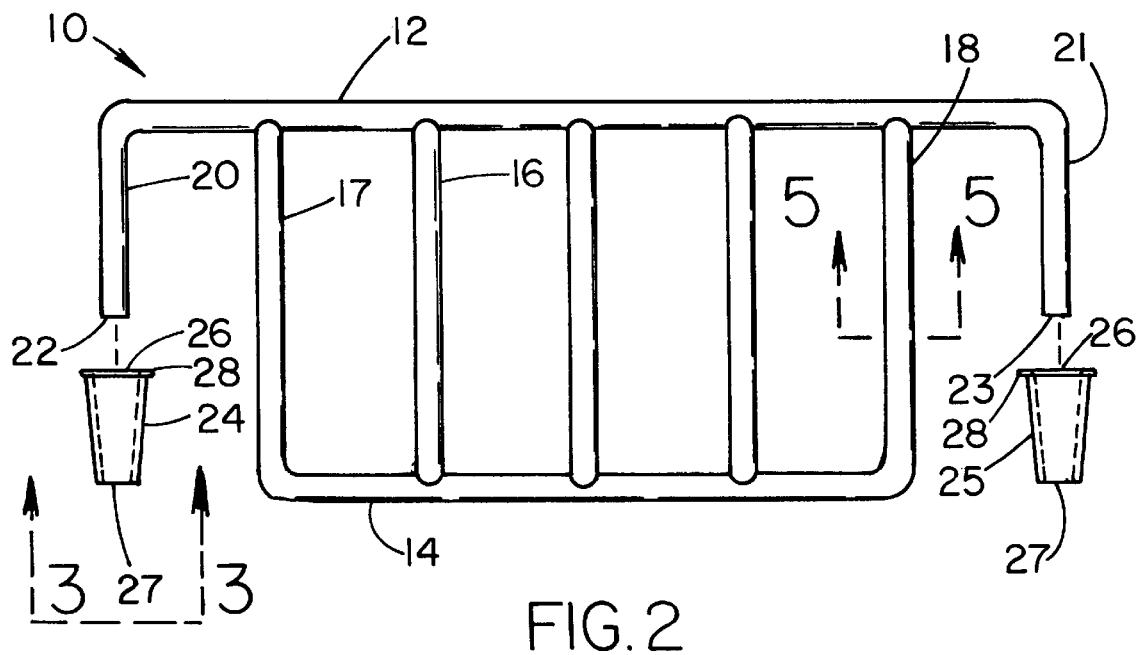
FIG. 2 is a schematic side view of the present invention.
Figure 3:
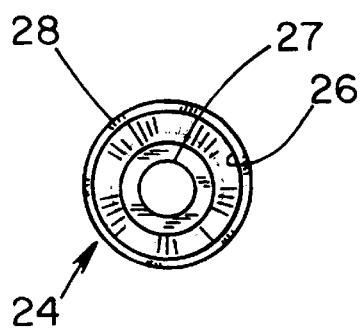
FIG. 3 is a schematic bottom side view of a sleeve of the present invention as seen from line 3—3 of FIG. 2.
Figure 4:
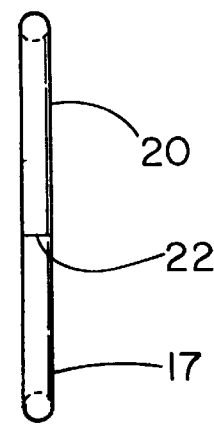
FIG. 4 is a schematic side view of the present invention.

In closer detail, the gate attachment 10 includes an elongate upper cross bar 12 having a pair of opposite ends and a longitudinal axis extending between its ends. An elongate lower cross bar 14 also having a pair of opposite ends is spaced apart from the upper cross bar 12. A plurality of spaced apart elongate ribs 16,17,18 are extended between the upper and lower cross bars 12,14. Preferably, the lengths of the ribs 16,17,18 are generally perpendicular to the longitudinal axes of the upper and lower cross bars 12,14 and generally parallel to one another. In an ideal embodiment, the plurality of ribs 16,17,18 comprises at least five to seven ribs 16,17,18 which are spaced sufficiently far enough apart so that filled average sized grocery bags are unable to easily pass between the ribs. With reference to FIG. 2, in the preferred embodiment, one of the ribs 17 is extended from one end of the lower cross bar 14 and another of the ribs 18 is extended from another end of the lower cross bar 14.

As shown in FIG. 2, the gate attachment 10 includes a pair of insertion arms 20,21. One of the insertion arms 20 is downwardly extended from one end of the upper cross bar 12 while the other insertion arm 21 is extended from another end of the upper cross bar 12. Preferably, the length of the insertion arms 20,21 is about half the length of a rib 16. In the ideal embodiment, the length of each insertion arm 20,21 is generally perpendicular to the longitudinal axis of the upper cross bar 12 and generally parallel to the lengths of the ribs 16,17,18. Each of the insertion arms 20,21 has a lower terminal end 22,23 which are each adapted for removable insertion into a post hole 5,6 of side wall 3,4 of load bed 2 of a vehicle 1.

Figure 5:
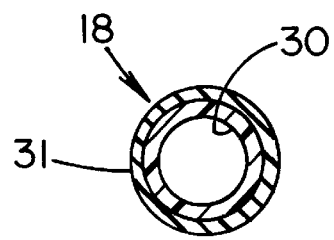
FIG. 5 is a schematic sectional view of a rib of the present invention taken from line 5—5 of FIG. 2.

Ideally as represented in FIG. 5, the upper and lower cross bars 12,14, the ribs 16,17,18, and the insertion arms 20,21 are constructed from generally cylindrical tubes 30 each preferably having a resiliently compressible outer layer 31, such as a rubber outer layer. In this ideal embodiment, it is also preferred that diameter of the tubes 30 be at least about 1 inch.

Preferably, the gate attachment 10 also includes a pair of sleeves 24,25 which are adapted for insertion into a post hole 5,6 of side wall 3,4 of load bed 2 of a vehicle 1. Each of the sleeves 24,25 has upper and lower ends 26,27. The upper end 26 of each of the sleeves 24,25 has an opening for permitting insertion of a terminal end 22,23 of one of the insertion arms 20,21 therein. Preferably, the sleeves 24,25 are generally frusto-conical and taper from their respective upper end 26 towards their respective lower end 27. Ideally, the upper end 26 of each of the sleeves 24,25 has an annular rim 28 extending therearound which is designed for resting on the side wall 3,4 of a load bed 2 of a vehicle 1 when the sleeve 24,25 is inserted into a post hole 5,6 in the side wall 3,4 of the load bed 2 of a vehicle 1.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A gate for mounting to a load bed of a vehicle having side walls each having a plurality of post holes therein, said gate comprising:

an elongate upper cross bar having a pair of opposite ends and a longitudinal axis;

an elongate lower cross bar having a pair of opposite ends and a longitudinal axis and being spaced apart from said upper cross bar;

a plurality of spaced apart elongate ribs each having a length and being extended between said upper and lower cross bars;

a pair of insertion arms being extended from said upper cross bar;

each of said insertion arms having a lower terminal end, each of said lower terminal ends of said insertion arms being adapted for insertion into a post hole of a side wall of a load bed of a vehicle;

a pair of sleeves, each of said sleeves being adapted for insertion into a post hole of a side wall of a load bed of a vehicle;

each of said sleeves having upper and lower ends, said upper end of each of said sleeves having an opening for permitting insertion of a terminal end of one of said insertion arms therein; and wherein said sleeves are generally frusto-conical and taper from their respective upper end towards their respective lower end.

2. The gate of claim 1, wherein said lengths of said ribs are generally perpendicular to said longitudinal axes of said upper and lower cross bars.

3. The gate of claim 2, wherein said lengths of said ribs are generally parallel with one another.

4. The gate of claim 1, wherein said plurality of ribs comprises between five and seven ribs.

5. The gate of claim 1, wherein one of said ribs is extended from one end of said lower cross bar, and wherein another of said ribs is extended from another end of said lower cross bar.

6. The gate of claim 1, wherein one of said insertion arms is extended from one end of said upper cross bar and another of said insertion arms is extended from another end of said upper cross bar.

7. The gate of claim 1, wherein the length of each of said insertion arms is generally perpendicular to said longitudinal axis of said upper cross bar.

8. The gate of claim 7, wherein the lengths of said insertion arms are generally parallel to said lengths of said ribs.

9. The gate of claim 1, wherein said upper and lower cross bars, said ribs, and said insertion arms comprise generally cylindrical tubes each having a resiliently compressible outer layer.

10. The gate of claim 9, wherein said outer layers of the tubes comprises rubber, and wherein the diameter of said tubes is at least about 1 inch.

11. The gate of claim 1, wherein said upper end of each of said sleeves has an annular rim extending therearound.

12. A gate for mounting to a load bed of a vehicle having side walls each having a plurality of post holes therein, said gate comprising:

an elongate upper cross bar having a pair of opposite ends and a longitudinal axis;

an elongate lower cross bar having a pair of opposite ends and a longitudinal axis and being spaced apart from said upper cross bar;

a plurality of spaced apart elongate ribs each having a length and being extended between said upper and lower cross bars, said lengths of said ribs being generally perpendicular to said longitudinal axes of said upper and lower cross bars, said lengths of said ribs being generally parallel with one another, wherein said plurality of ribs comprises between five and seven ribs;

wherein one of said ribs is extended from one end of said lower cross bar, and wherein another of said ribs is extended from another end of said lower cross bar;

a pair of insertion arms, one of said insertion arms being extended from one end of said upper cross bar and another of said insertion arms being extended from another end of said upper cross bar, wherein the length of each of said insertion arms is generally perpendicular to said longitudinal axis of said upper cross bar, wherein the lengths of said insertion arms are generally parallel to said lengths of said ribs;

each of said insertion arms having a lower terminal end, each of said lower terminal ends of said insertion arms being adapted for insertion into a post hole of a side wall of a load bed of a vehicle;

wherein said upper and lower cross bars, said ribs, and said insertion arms comprise generally cylindrical tubes each having a resiliently compressible outer layer, wherein said outer layers of the tubes comprises rubber, wherein the diameter of said tubes is at least about 1 inch; and a pair of sleeves, each of said sleeves being adapted for insertion into a post hole of a side wall of a load bed of a vehicle, each of said sleeves having upper and lower ends, said upper end of each of said sleeves having an opening for permitting insertion of a terminal end of one of said insertion arms therein, wherein said sleeves are generally frusto-conical and taper from their respective upper end towards their respective lower end, wherein said upper end of each of said sleeves has an annular rim extending therearound.

* * * * *